(12) United States Patent
Reid

(10) Patent No.: US 9,844,745 B2
(45) Date of Patent: Dec. 19, 2017

(54) CONTROLLED PULSE AIR FILTER SYSTEM

(71) Applicant: RoboVent Products Group, Inc., Sterling Heights, MI (US)

(72) Inventor: John Reid, Royal Oak, MI (US)

(73) Assignee: ROBOVENT PRODUCTS GROUP, INC., Sterling Heights, MI (US)

(*) Notice: Subject to any disclaimer, the term of this patent is extended or adjusted under 35 U.S.C. 154(b) by 0 days.

(21) Appl. No.: 15/291,362

(22) Filed: Oct. 12, 2016

(65) Prior Publication Data

US 2017/0028332 A1 Feb. 2, 2017

Related U.S. Application Data

(62) Division of application No. 13/769,641, filed on Feb. 18, 2013, now Pat. No. 9,468,879.

(60) Provisional application No. 61/702,378, filed on Sep. 18, 2012.

(51) Int. Cl.
*B01D 46/00* (2006.01)
*B01D 46/24* (2006.01)

(52) U.S. Cl.
CPC ....... *B01D 46/0068* (2013.01); *B01D 46/002* (2013.01); *B01D 46/2403* (2013.01); *B01D 46/2411* (2013.01); *B01D 2267/30* (2013.01)

(58) Field of Classification Search
CPC .. B01D 46/00; B01D 46/0068; B01D 46/002; B01D 46/2411; B01D 2267/30

USPC ............ 55/282–305, 341.1–341.7, 361–382; 96/424–429; 95/273–287; 960/424–429
See application file for complete search history.

(56) References Cited

U.S. PATENT DOCUMENTS

| 3,954,426 | A | * | 5/1976 | Brange | ............. | B01D 46/0068 55/292 |
|---|---|---|---|---|---|---|
| 5,616,171 | A | * | 4/1997 | Barris | ................ | B01D 46/0068 55/282.3 |
| 6,270,732 | B1 | * | 8/2001 | Gardner | ............. | B01D 46/0068 422/171 |
| 2002/0073849 | A1 | * | 6/2002 | Buettner | ............ | B01D 39/1623 95/280 |

* cited by examiner

*Primary Examiner* — T. Bennett McKenzie
(74) *Attorney, Agent, or Firm* — William H. Honaker; Dickinson Wright PLLC

(57) ABSTRACT

An air filtering system and method for self-cleaning the same is provided. The system has a plurality of air filters including a first filter and at least one neighboring filter. A blower fan pulls air through the filters. A plurality of compressed air injectors are provided adjacent the filters including a first injector and at least one neighboring injector. Self-cleaning is achieved while the blower fan is running by preforming several steps including activating the first injector to force compressed air into the first filter and discharge particulate from the first filter followed by deactivating the first injector. The steps further provide reactivating the first injector and simultaneously activating the neighboring injector while the discharged particulate is airborne to provide an air shield about the first filter and force the discharged particulate away from the first filter and the neighboring filter. These steps are repeated for each filter.

16 Claims, 3 Drawing Sheets

CONTROLLED PULSE AIR FILTER SYSTEM

CROSS REFERENCE TO RELATED APPLICATION

This is a divisional application which claims priority to U.S. patent application Ser. No. 13/769,641, filed Feb. 18, 2013, entitled "Controlled Pulse Air Filter System" which claims benefit to provisional application No. 61/702,378, filed on Sep. 18, 2012, entitled "Controlled Pulse Air Filter System,", the entirety of which is hereby incorporated by reference.

TECHNICAL FIELD

This invention relates generally to air filtering systems and, more particularly, to a controlled pulse air filtering system. A method for self-cleaning the filters of such an air filtering system is also described and claimed herein.

BACKGROUND OF THE INVENTION

Air filtering units are commonly used in manufacturing processes. One typical application is to clean the air within a welding station. A conduit is connected between an opening in the welding station and the air filtering unit. During operation of the air filtering unit, the air within the welding station is drawn from the welding station, through the conduit and into the filtering unit by a blower fan. A plurality of filters are mounted in the filtering unit and the air from the welding station is pulled through the filters. the filters extract the particulate from the air and then the air is expelled from the filter unit back into the surrounding environment.

Over time, the filters become dirty with the particulate and require cleaning. There are typically two times when the filters are cleaned. One time is during total shut down and the other during operation. The latter is done to extend the period between the cleanings done at total shutdown. Shutdown, as will be appreciated, effects the normal operation of the manufacturing operations and the longer the period between the total shutdowns for cleaning the better.

To clean such air filtering units, air injectors are traditionally positioned adjacent to each of the filters. The air injectors are supplied with compressed air. All of the air injectors are simultaneously actuated forcing compressed air into and through the filters, from the inside to the outside, for the purpose of discharging any particulates that have accumulated on the filters. Generally, the compressed air released from the air injectors and gravity directs the discharged particulates into a collector unit disposed below the filters. During total shutdown, a large amount of the particulate that has accumulated on the filters can be forced out of the filters. However, during cleaning with the unit operational (i.e. when the blower fan is running), only a small amount of the particulate is discharged and most is sucked back onto the filters because the filter unit is drawing air through the filters. The particulate that is discharged from the filters is for the most part immediately pulled back onto the filters.

The controlled pulse of the present invention overcomes this problem of the discharged particulate being drawn back onto the filters during cleaning operations when the filter unit is operational.

SUMMARY OF THE INVENTION

In general terms, this invention provides an improved method for cleaning the filters of an air filtering unit while the unit is operational. The method of the present invention includes providing a plurality of air filters and providing a plurality of compressed air injectors adjacent the air filters. During operation of the unit, a first injector is activated to force compressed air into a first filter. This discharges particulate from the first filter. After activating the first injector, the first injector is immediately deactivated and re-activated. When the first injector is re-activated, the injectors directly adjacent the first injector are also activated. This step is performed while the discharged particulate is airborne to shield the first filter and force at least a portion of the discharged particulate away from the first filter and the adjacent filters. After the first filter is cleaned in accordance with this method, the operation is performed on each of the remaining filters.

According to another aspect of the invention, a self-cleaning air filtering system is provided. The self-cleaning air filtering system includes a programmable logic controller operably connected to compressed air injectors to actuate the injectors. The programmable logic controller is programmed with executable instructions defined by the steps of the inventive method described above. Accordingly, the executable instructions of the programmable logic controller include activating a first injector to force compressed air into the first filter and discharge particulate from the first filter. The first injector is deactivated for a short time and then the first injector is reactivated along with injectors directly adjacent the first injector. This is done while the discharged particulate is airborne to provide an air shield about the first filter and force at least a portion of the discharged particulate away from the first filter. The programmable logic controller is programmed to repeat the executable instructions for each of the air filters in the system.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a method for cleaning particulate from the filters of an air filtering system is provided.

Figure 1:
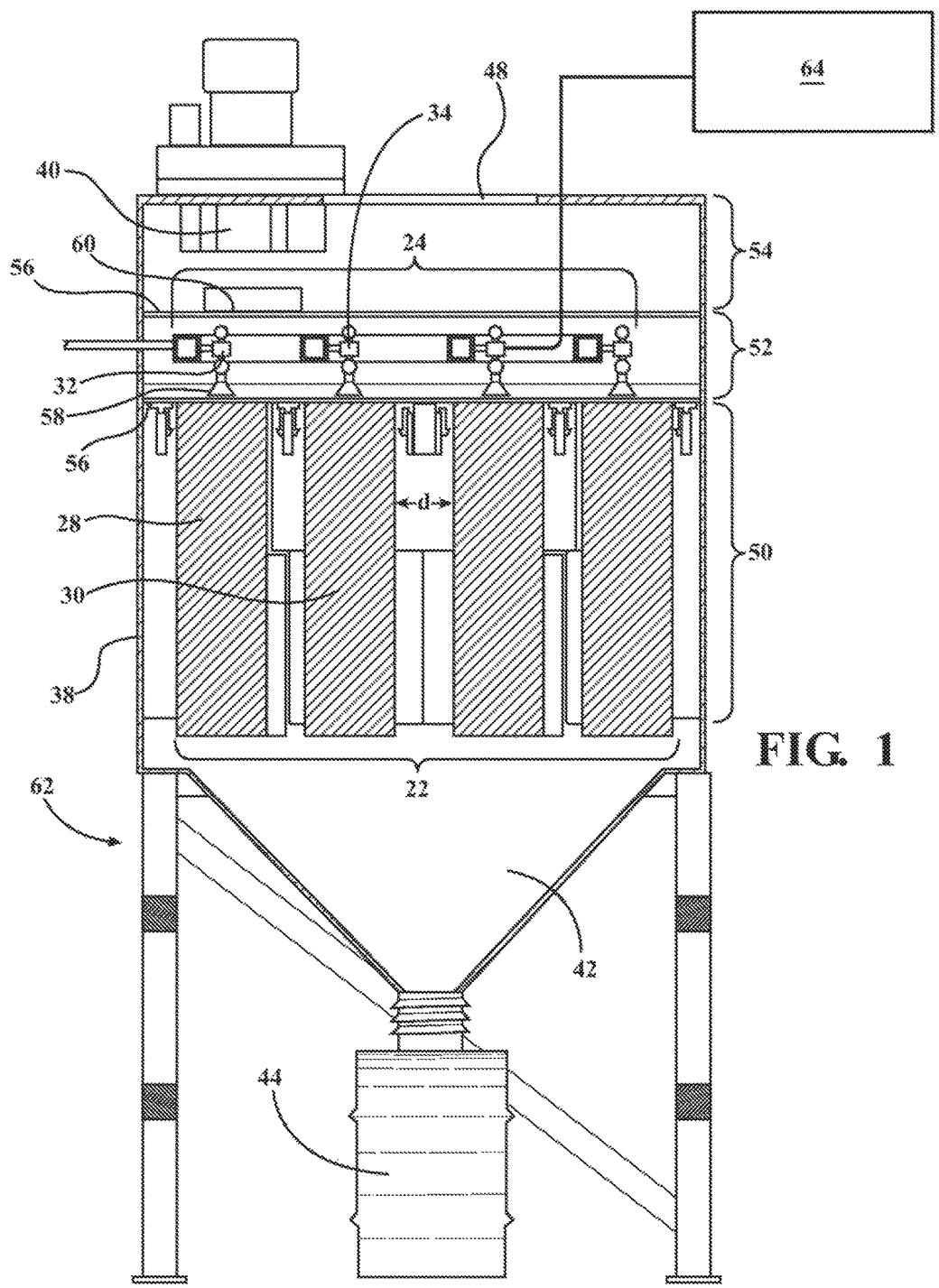
FIG. 1 is a front cutaway view of the controlled pulse air filter system of the present invention.
Figure 2:
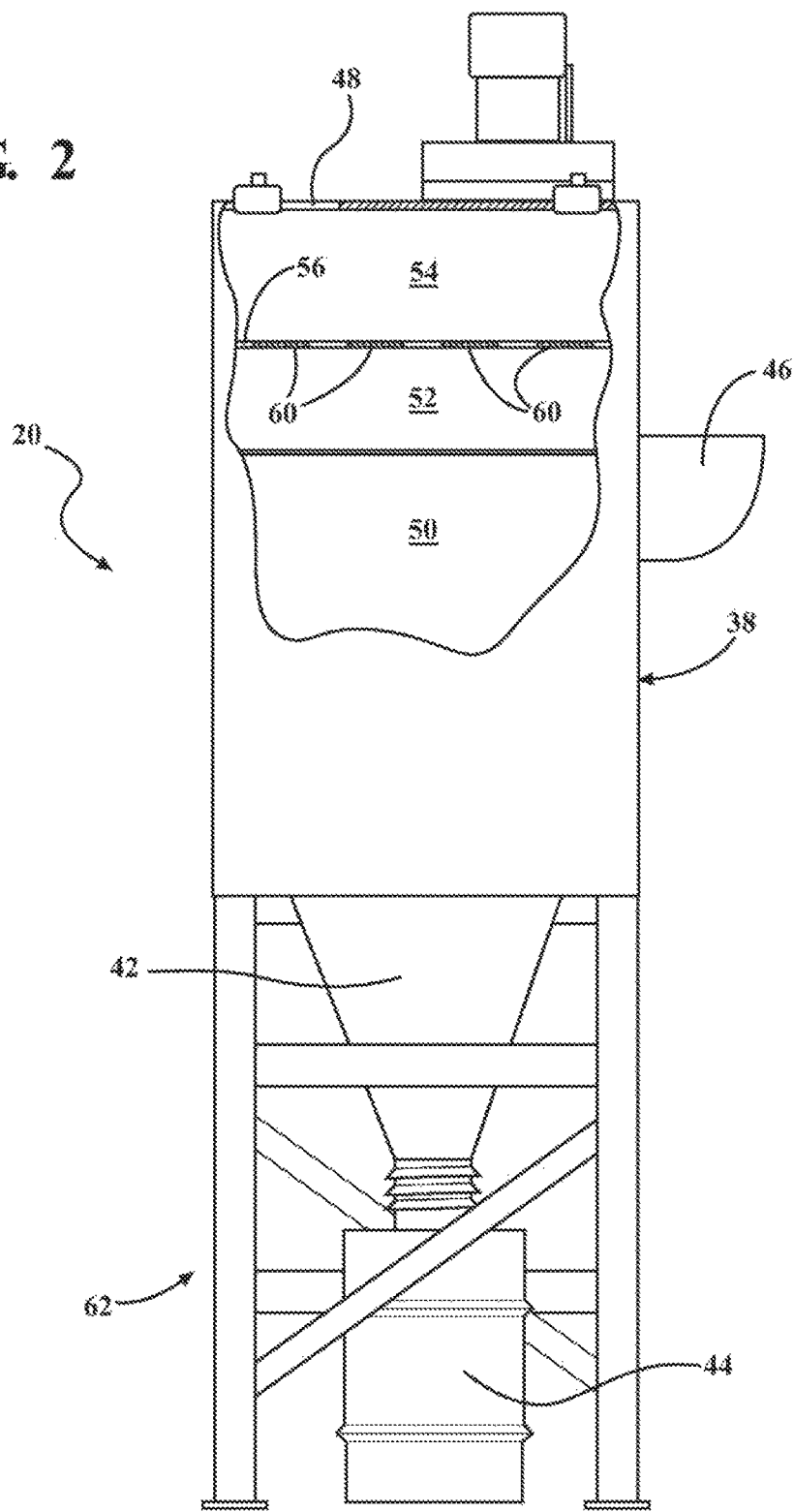
FIG. 2 is a side partial cutaway view of the controlled pulse air filter system of the present invention.

Referring to FIGS. 1 and 2, the method is performed by initially providing an air filtering system 20. The disclosed air filtering system 20 includes a plurality of air filters 22 serviced by a plurality of compressed air injectors 24. While the plurality of air filters 22 may be arranged in a variety of configuration in accordance with the invention, it is envisioned that the filters 22 may be disposed in side-by-side spaced relationship. Similarly, each filter 22 in the plurality of air filters 22 may take a variety of shapes and configurations without departing from the scope of this invention. For example, each air filter 22 may include a filter material 26 of an elongated cylindrical shape surrounding a hollow core. The filters 22 may be spaced apart from one another by a predetermined distance d extending linearly between the filter material 26 of adjacent filters 22. As such, the predetermined distance d may be the smallest distance that can be measured between adjacent filters 22 arranged in side-by-side spaced relationship.

Still referring to FIGS. 1 and 2, the plurality of air filters 22 include a first filter 28 and at least one neighboring filter 30 adjacent the first filter 28. Similarly, the plurality of compressed air injectors 24 include a first injector 32 and at least one neighboring injector 34 adjacent the first injector 32. It should be appreciated that the first injector 32 is disposed adjacent the first filter 28 and that each neighboring injector 34 is disposed adjacent the corresponding neighboring filter 30. In accordance with this aspect of the invention, there is at least one compressed air injector 24 for each filter 22. A compressed air supply 36 is provided in fluid communication with the compressed air injectors 24 to supply the injectors 24 with a source of compressed air. It should be appreciated that the present invention is not limited to a compressed air supply 36 and that other types of compressed gas may alternatively be supplied to the injectors 24. It should also be appreciated that where the filters 22 have a cylindrically shaped filter material 26 defining a hollow core, each of the compressed air injectors 24 may be aimed such as to provide a pulse of compressed air into the hollow core of the filters 22. Without intending to be bound by the theory, it is believed that the pulse of compressed air into the hollow core of the filters 22 discharges particulate that has accumulated on the filter material 26 by introducing a shockwave of air into the filter 22. It is further believed that this shockwave functions to expand folded pleats of the filter material 26 thereby releasing dirt that has accumulated on the filter 22.

The plurality of air filters 22 may be provided within a housing 38. A blower fan 40 maybe provided in fluid communication with the housing 38 to facilitate the flow of air through the filters 22. While the housing 38 may take a variety of forms, the housing 38 may be generally rectangular in shape. The housing 38 may also be provided with a collector unit 42 in fluid communication with the filters 22. During use of the air filtering system 20, the collector unit 42 may collect and trap particulate disposed within the housing 38. Generally, the collector unit 42 may take the form of a frustoconcial shape extending downwardly from the housing. The collector unit 42, or a trap 44 attached thereto, may be removably attached to the housing 38 for ease of cleaning. Together with the collector unit 42, the housing 38 may define an inlet 46 for receiving a volume of air to be filtered. The housing 38 may further define an outlet 48 for discharging a volume of filtered air after it has passed through the filters 22.

The method includes a series of steps wherein the compressed air injectors 24 are actuated to deliver a series of controlled pulses of compressed air to the plurality of air filters 22. The method includes the step of activating the first injector 32 for a first time duration to force compressed air into the first filter 28 and discharge particulate from the first filter 28. This step is referred to herein as the activating step. It should be appreciated that during the activating step, the first injector 32 is activated while the at least one neighboring injector 34 remains deactivated. The method proceeds with the step of deactivating the first injector 32 for a second time duration. This step is referred to herein as the deactivating step. The second time duration of the deactivating step may be shorter than the first time duration of the activating step. Accordingly, the first injector 32 may be deactivated for only a brief moment. More specifically, the second time duration of the deactivating step is less than a time required for the discharged particulate to travel the predetermined distance d between the first filter 28 and the neighboring filter 30 or neighboring filters 30. This allows enough time for the particulate to leave the first filter 28 but does not present enough time for the particulate to migrate across the predetermined distance d to become entrained on the at least one neighboring filter 30.

The method further includes the step of reactivating the first injector 32 and simultaneously activating the at least one neighboring injector 34 for a third time duration. This step is referred to herein as the reactivating step. As the term is used herein, the reactivating step includes both the reactivation of the first injector 32 and the simultaneously activation of the at least one neighboring injector 34. The third time duration of the reactivating step may be longer than the first time duration of the activating step. Accordingly, the first injector 32 and the at least one neighboring injector 34 provide simultaneous pulses of compressed air while the discharged particulate is airborne and force at least a portion of the discharged particulate away from the first filter 28 and the at least one neighboring filter 30, directing the discharged particulate towards the collector unit 42. Without intending to be bound by the theory, it is believed that the reactivating step provides an air shield about the first filter 28 that prevents the first filter 28 and the at least one neighboring filter 30 from entrapping or re-entrapping the discharged particulate when it is airborne as a result of the activation of the first injector 32 during the activation step.

In addition to differences in the time duration between compressed air pulses of the activating and reactivating steps, the pressure of the compressed air may differ between the activating and reactivating step. For instance, the activating step of activating the first injector 32 to force compressed air into the first filter 28 and discharge articulate from the first filter 28 may further include supplying a first pressure pulse to the first filter 28. The reactivating step of reactivating the first injector 32 and activating the at least one neighboring injector 34 simultaneously following the deactivation of the first injector 32 and while the discharged particulate is airborne may further include supplying a second pressure pulse simultaneously to the first filter 28 and the at least one neighboring filter 30 wherein the first pressure pulse is greater than the second pressure pulse. In other words, the first pressure pulse of the activating step may be of a higher or greater positive pressure than that of the second pressure pulse of the reactivating step.

These method steps may then be repeated for each of the plurality of air filters 22. Consequently, the filter 22 being designated as the first filter 28 will change with each iteration of the method until all of the filters 22 have been cleaned by the controlled pulses of compressed air. Advantageously, the subject method may be employed during operation of the air filtering system 20. As such, the method of delivering the controlled pulses of compressed air to the filters 22 may be performed while air is being communicated through the filters 22. In other words, the method steps recited above may all be performed while the blower fan 40 is running to draw air through the filters 22. Nevertheless, it should be appreciated that the subject method may be performed while the air filtering system 20 is not in operation.

Figure 3:
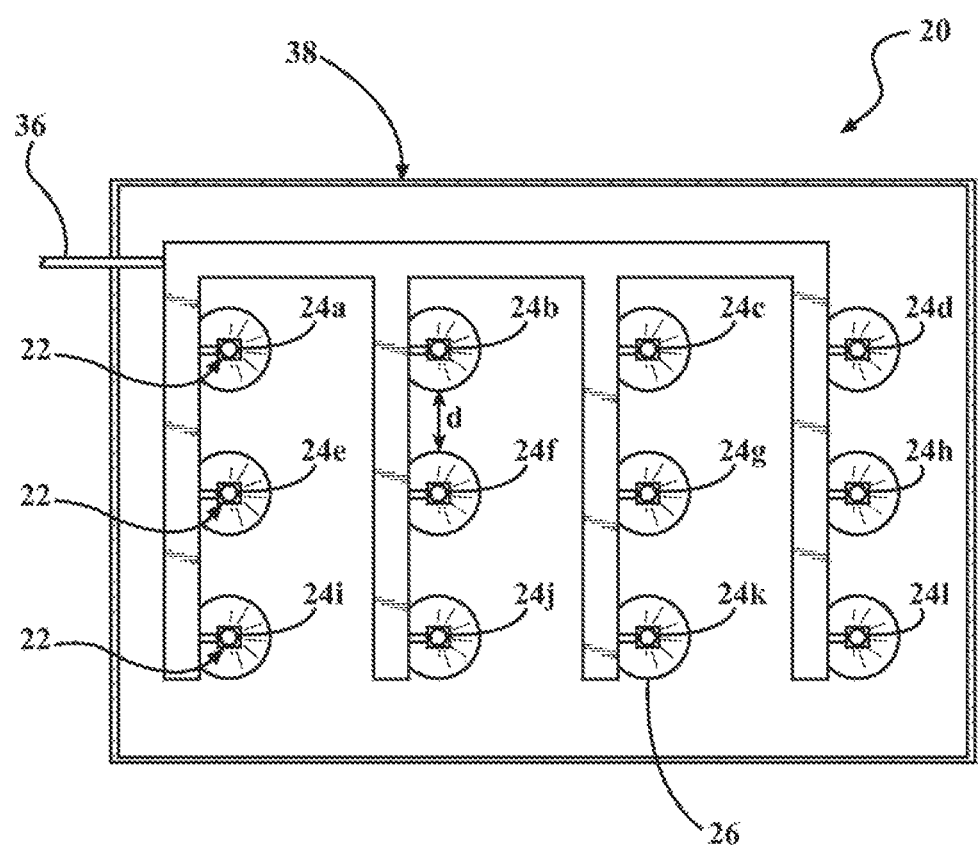
FIG. 3 is a top cutaway view of the controlled pulse airfiltering system showing the plurality of compressed air injectors of the present invention.

More particularly, FIG. 3 illustrates an exemplary air filter system 20 of the subject invention having a total of twelve filters 22 and twelve injectors 24a-1. For a first exemplary iteration of the method described herein, injector 24a may be designated as the first injector 32 and injectors 24b, 24f, and 24e may be designated as the neighboring injectors 34 observing that injectors 24b, 24f, and 24e are directly adjacent injector 24a. In accordance with the method described herein, the first injector 24a is activated while the neighboring injectors 24b, 24f, and 24e remain deactivated. Next, the first injector 24a is deactivated. Following the deactivation of the first injector 24a, the first injector 24a is reactivated and, at the same time, the neighboring injectors 24b, 24f, and 24e are activated to shield the filters 22 from the discharged particulate as it is travels to the collector unit 42. This cleaning methodology may then be repeated for each of the filters 22 and repeats itself for as long as the air filter system 20 is in operation.

For instance, the method may continue with a second exemplary iteration wherein injector 24b is designated as the first injector 32 and injectors 24a, 24f, and 24c are designated as the neighboring injectors 34 observing that injectors 24a, 24f, and 24c are directly adjacent injector 24b. In accordance with the method, the first injector 24b is activated while the neighboring injectors 24a, 24f, and 24c remain deactivated. Next, the first injector 24b is deactivated. Following the deactivation of the first injector 24b, the first injector 24b is reactivated and, at the same time, the neighboring injectors 24a, 24f, and 24c are activated. It should be appreciated that in the second exemplary iteration, the plurality of neighboring injectors 34 could be expanded to further include injectors 24e and 24g.

Similarly, the method may continue with a third exemplary iteration wherein injector 24f is designated as the first injector 32 and injectors 24b, 24e, 24j, and 24g are designated as the neighboring injectors 34 observing that injectors 24b, 24e, 24j, and 24g are directly adjacent injector 24f. In accordance with the method, the first injector 24f is activated while the neighboring injectors 24b, 24e, 24j, and 24g remain deactivated. Next, the first injector 24f is deactivated. Following the deactivation of the first injector 24f, the first injector 24f is reactivated and, at the same time, the neighboring injectors 24b, 24e, 24j, and 24g are activated. Again, it should be appreciated that in the third exemplary iteration, the plurality of neighboring injectors 34 could be expanded to further include injectors 24a, 24i, 24k and 24c.

Referring back to FIGS. 1 and 2, a self-cleaning air filtering system 20 adapted to perform the method described herein is provided. The air filtering system 20 has a housing 38 including an inlet 46 and an outlet 48. The housing 38 may be divided into several plenums including a first plenum 50, a second plenum 52, and a third plenum 54 each being partially separated from one another by a plurality of dividers 56. The first plenum 50, also referred to as the dirty air plenum, is adjacent the inlet 46 and receives a volume of air from the inlet 46 to be filtered. As an example, the inlet 46 may be in fluid communication with a welding station. The first plenum 50 houses a plurality of air filters 22 including a first filter 28 and at least one neighboring filter 30 adjacent the first filter 30. The plurality of air filters 22 may be disposed in side-by-side spaced relationship and each air filter 22 includes a filter material 26 of an elongated cylindrical shape surrounding a hollow core. The plurality of air filters 22 may be mounted to the divider 56 partially separating the first plenum 50 and the second plenum 52. Additionally, this divider 56 may include a plurality of holes that are radially aligned with the hollow core of each filter 22 through which air may travel from the first plenum 50 to the second plenum 52.

The second plenum 52, also referred to as the air tank plenum, is disposed between the first plenum 50 and the third plenum 54. The second plenum 52 may house a plurality of compressed air injectors 24 adjacent to the air filters 22 including a first air injector 32 adjacent the first filter 28 and at least one neighboring injector 34 adjacent each neighboring filter 30. The air injectors 24 are positioned to force compressed air into the hollow core of the air filters 22 and each injector 24 may further include a nozzle 58 configured to diffuse the air pulse provided by the injector 24 over a larger area. A compressed air supply 36 is provided in fluid communication with the compressed air injectors 24 to supply the injectors 24 with compressed air. It should be appreciated that the compressed air supply 36 could be a tank of compressed air or an air compressor. Further, the compressed air supply 36 may be part of the air filtering system 20, a standalone unit, or a compressed air line common in many factories or plants. As such, the capacity of the compressed air supply 36 may be limited such that the pressure provided to the injectors 24 may vary depending on the frequency with which the injectors 24 are activated. The divider 56 partially separating the second plenum 52 and the third plenum 54 may include a plurality of venturi openings 60 through which air may travel from the second plenum 52 to the third plenum 54.

The third plenum 54, also referred to as the blower plenum, is adjacent the outlet 48 which discharges the filtered air. The third plenum 54 may house a blower fan 40 for drawing air through the air filtering system 20. As a result of the blower fan 40 in combination with the venturi openings 60, the first plenum 50 and second plenum 52 may operate in a negative pressure environment while the third plenum 54 may operate in a positive pressure environment. The negative pressure environment of the first plenum 50 and second plenum 52 facilitates drawing dirty air in through inlet 46 and through the filters 22 from outside the filter material 26 to inside the hollow core. The positive pressure environment of the third plenum 54 facilitates expelling filtered air out through the outlet 48. Accordingly, an exemplary flow path of air through the air filtering system 20 is as follows. Air is drawn in through the inlet 46 and received in the first plenum 50. The air is pulled through the filters 22 from outside the filter material 26 and into the hollow core of the filters 22. The air passes from the hollow core of the filters 22, through the holes in the divider 56 separating the first plenum 50 and the second plenum 52, and into the second plenum 52. The air then travel from the second plenum 52 to the third plenum 54 through the venturi openings 60. Once in the third plenum 54, the air is expelled through the outlet 48.

A collector unit 42 is disposed in fluid communication with the filters 22 for collecting and trapping particulate. More particularly, the collector unit 42 may be connected to the housing 38 adjacent the first plenum 50. Both the air pulses from the injectors 24 and gravity may facilitate the passage of particulate from the filters 22 to the collector unit 42. The collector unit 42 may have upwardly sloping sides or may have a frustoconical shape. A trap 44 may be removably connected to the collector unit 42 for receiving the particulate. The trap 44 may generally be barrel shaped and disposed beneath the collector unit 42. As such, the trap 44 can be disconnected and cleaned. Alternatively, the trap 44 may be in the form of a tray that may be slid out from the collector unit 42 and cleaned. The air filtering system 20 may be supported by a frame 62. The frame 62 may be attached to the collector unit 42 and/or the housing 38.

The air filtering system 20 further includes a programmable logic controller 64 electrically connected to the compressed air injectors 24. The programmable logic controller 64 is programmed with executable instructions including activating the first air injector 32 for a first time duration to force compressed air into the first filter 28. This discharges particulate from the first filter 28, rendering it airborne outside the filter material 26 of the first filter 28 and within the first plenum 50. The executable instructions also include deactivating the first air injector 32 for a second time duration being shorter than the first time duration and reactivating the first air injector 32 and simultaneously activating the at least one neighboring injector 34 for a third time duration being longer than the first time duration. Accordingly, the first injector 32 is reactivated and the at least one neighboring injector 34 is simultaneously activated while the discharged particulate is airborne to provide an air shield about the first filter 28 and force at least a portion of the discharged particulate away from the first filter 28 and the at least one neighboring filter 30 and towards the collector unit 42. The programmable logic controller 64 further provides for repeating the executable instructions for each of the air filters 22.

As a result of these executable instructions and the method described above, a greater amount of the discharged particulate is forced into the collector unit 42 than would be achieved by traditional online cleaning operations where all of the injectors 24 are activated at the same time while the blower fan 40 is running. Through testing, as much as five times the discharged particulate reached the collector unit 42 when compared to the traditional online cleaning operation.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A self-cleaning air filtering system, comprising;
a plurality of air filters including a first filter and at least one neighboring filter adjacent said first filter,
a plurality of compressed air injectors including a first injector and a neighboring injector for each neighboring filter for forcing compressed air into said air filters,
a programmable logic controller operably connected to said compressed air injectors to actuate said compressed air injectors and said control unit being programmed with executable instructions including activating said first injector to force compressed air into said first filter and discharge particulate from said first filter and deactivating said first injector and reactivating said first injector and simultaneously activating said at least one neighboring injector while the discharged particulate is airborne to provide an air shield about said first filter and force a portion of the discharged particulate away from said first filter and said at least one neighboring filter;
said programmable logic controller is programmed to repeat said executable instructions for each of said air filters in said plurality of air filters;
said executable instructions programmed into said programmable logic controller include activating said first injector for a first time duration and deactivating said first injector for a second time duration being shorter than said first time duration and reactivating said first injector and simultaneously activating said at least one neighboring injector for a third time duration being longer than said first time duration;
said first filter and said at least one neighboring filter are spaced apart by a predetermined distance and said second time duration is less than a time required for the discharged particulate to travel said predetermined distance between said first filter and said at least one neighboring filter;
said at least one neighboring injector includes a plurality of neighboring injectors and said executable instructions programmed into said programmable logic controller include reactivating said first injector and simultaneously activating all neighboring injectors in said plurality of neighboring injectors;
said system including a housing including an inlet for receiving air and an outlet for discharging air,
a blower fan disposed within said housing for communicating air from said inlet through said plurality of air filters to said outlet; and
wherein said programmable logic controller is programmed to perform said executable instructions while said blower fan is communicating air from said inlet through said plurality of air filters to said outlet.

2. The system of claim 1, wherein each filter is provided with one injector adjacent said filter with said first injector being disposed adjacent said first filter and each neighboring injector being disposed adjacent each neighboring filter.

3. The system of claim 2, further comprising;
a collector unit in fluid communication with said plurality of air filters for collecting and trapping particulate discharged from said plurality of air filters.

4. The system of claim 3, wherein said air filters are disposed in side-by-side spaced relationship forming a rectangular grid-like arrangement.

5. The system of claim 4, further comprising;
a compressed air supply in fluid communication with said compressed air injectors for supplying compressed air to said compressed air injectors.

6. The system of claim 5, wherein said programmable logic controller is electrically connected to said compressed air injectors and controls actuation of said compressed air injectors by sending electronic signals to said compressed air injectors.

7. The system of claim 6, wherein each of said air filters are formed of at least a filter material having an elongated cylindrical shape surrounding a hollow core.

8. The system of claim 7, wherein said predetermined distance is the shortest distance between said first filter and said at least one neighboring filter and extends linearly from said filter material of said first filter to said filter material of said at least one neighboring filter.

9. A self-cleaning air filtering system, comprising;
a plurality of air filters including a first filter and at least one neighboring filter adjacent said first filter,
a plurality of compressed air injectors including a first injector and a neighboring injector for each neighboring filter for forcing compressed air into said air filters,
a programmable logic controller operably connected to said compressed air injectors to actuate said compressed air injectors and said control unit being programmed with executable instructions including activating said first injector to force compressed air into said first filter and discharge particulate from said first filter and deactivating said first injector and reactivating said first injector and simultaneously activating said at least one neighboring injector while the discharged particulate is airborne to provide an air shield about said first filter and force a portion of the discharged particulate away from said first filter and said at least one neighboring filter;

said programmable logic controller is programmed to repeat said executable instructions for each of said air filters in said plurality of air filters;

said executable instructions programmed into said programmable logic controller include activating said first injector for a first time duration and deactivating said first injector for a second time duration being shorter than said first time duration and reactivating said first injector and simultaneously activating said at least one neighboring injector for a third time duration being longer than said first time duration;

said first filter and said at least one neighboring filter are spaced apart by a predetermined distance and said second time duration is less than a time required for the discharged particulate to travel said predetermined distance between said first filter and said at least one neighboring filter;

said at least one neighboring injector includes a plurality of neighboring injectors and said executable instructions programmed into said programmable logic controller include reactivating said first injector and simultaneously activating all neighboring injectors in said plurality of neighboring injectors;

a housing including an inlet for receiving air and an outlet for discharging air, and a blower fan disposed within said housing for communicating air from said inlet through said plurality of air filters to said outlet;

said programmable logic controller is programmed to perform said executable instructions while said blower fan is communicating air from said inlet through said plurality of air filters to said outlet.

10. The system of claim 9, wherein each filter is provided with one injector adjacent said filter with said first injector being disposed adjacent said first filter and each neighboring injector being disposed adjacent each neighboring filter.

11. The system of claim 10, further comprising;

a collector unit in fluid communication with said plurality of air filters for collecting and trapping particulate discharged from said plurality of air filters.

12. The system of claim 11, wherein said air filters are disposed in side-by-side spaced relationship forming a rectangular grid-like arrangement.

13. The system of claim 12, further comprising;

a compressed air supply in fluid communication with said compressed air injectors for supplying compressed air to said compressed air injectors.

14. The system of claim 13, wherein said programmable logic controller is electrically connected to said compressed air injectors and controls actuation of said compressed air injectors by sending electronic signals to said compressed air injectors.

15. The system of claim 14, wherein each of said air filters are formed of at least a filter material having an elongated cylindrical shape surrounding a hollow core.

16. The system of claim 15, wherein said predetermined distance is the shortest distance between said first filter and said at least one neighboring filter and extends linearly from said filter material of said first filter to said filter material of said at least one neighboring filter.

* * * * *